May 20, 1958  M. H. GRAHAM  2,835,190
SELF-ELEVATING HOLDER FOR COFFEE MAKER
Filed Feb. 8, 1955  3 Sheets-Sheet 1

INVENTOR
MAURICE H. GRAHAM,
BY Parry & Gruse
ATTORNEYS

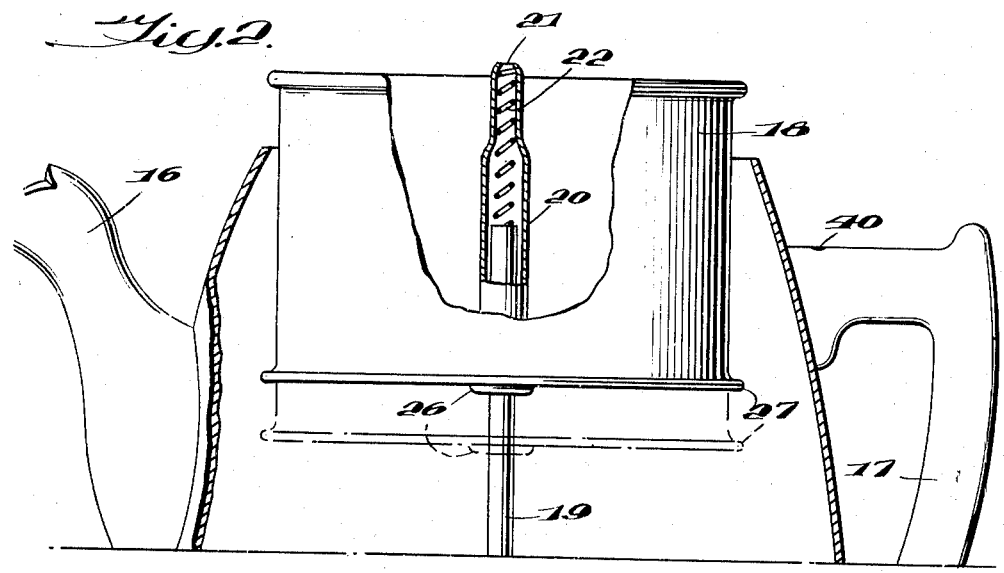
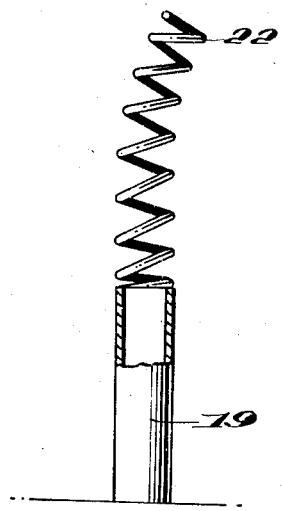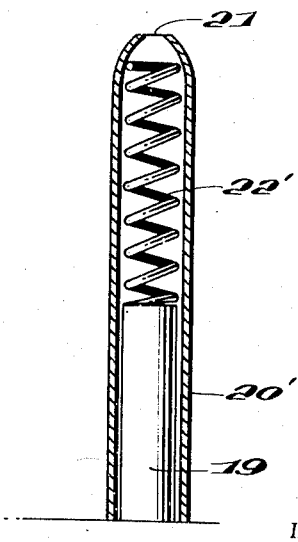

May 20, 1958 M. H. GRAHAM 2,835,190
SELF-ELEVATING HOLDER FOR COFFEE MAKER
Filed Feb. 8, 1955 3 Sheets-Sheet 3
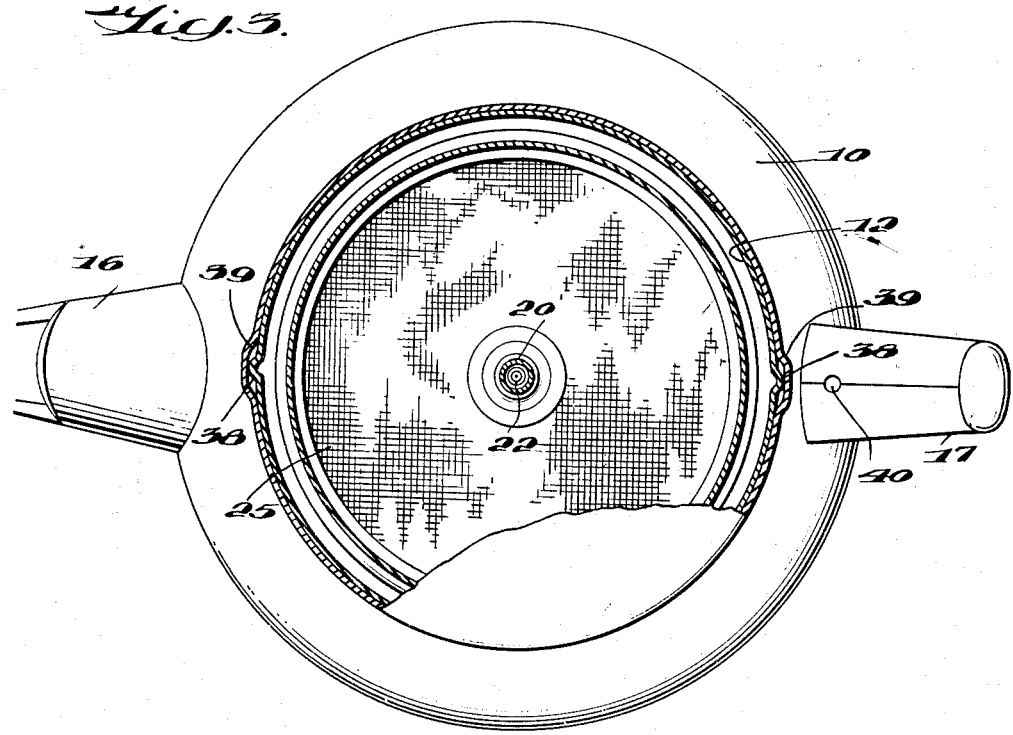
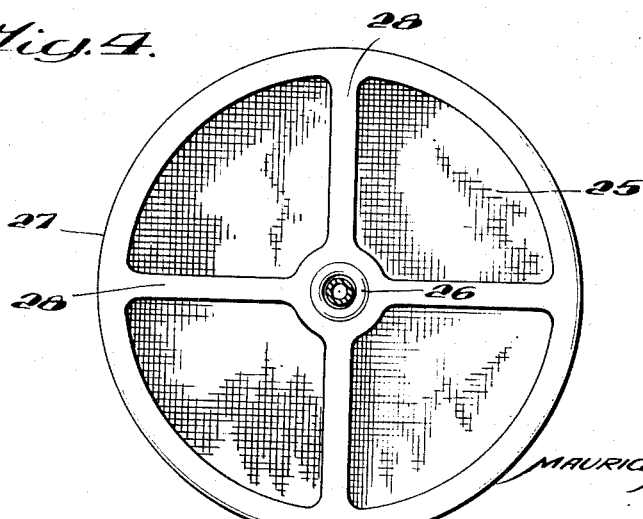
INVENTOR
MAURICE H. GRAHAM,
BY Parry & Jims
ATTORNEYS

United States Patent Office 2,835,190
Patented May 20, 1958

2,835,190

SELF-ELEVATING HOLDER FOR COFFE MAKER

Maurice H. Graham, Minneapolis, Minn.; Maurice W. Graham and Northwestern National Bank of Minneapolis, both of Hennepin County, Minn., executors of said Maurice H. Graham, deceased, assignors to Maurice W. Graham and Elwood M. Graham, trustees Application February 8, 1955, Serial No. 486,916

2 Claims. (Cl. 99—310)

This invention relates to coffee makers of the type wherein liquid to be infused is circulated through ground coffee held in a coffee holder, preferably the holder is mounted on a fountain tube having a connection with pumping means for effecting the circulation. More particularly the invention is directed to such a coffee maker having an improved novel self-elevating or "pop-up" coffee basket for the purpose of insuring that the user will properly position the fountain tube pump coupling when the coffee maker is placed in operation and for other reasons hereinafter more particularly set forth.

It is a general object of my invention to provide a coffee maker that will insure a user a proper seating of the fountain tube in an operative relation with respect to the liquid circulating means of a coffee maker.

A further object of the invention is to provide a coffee basket which is secured or maintained in a normal relation during the coffee brewing operation, but which is self-elevating above the rim or edge of the coffee making vessel when the top closure is released.

One type of coffee making device in general consists of a vessel in which the liquid to be infused is contained together with an upper basket to hold the ground coffee material; the upper edge or rim of said basket coinciding with the upper edge or rim opening of said vessel. A central fountain tube is provided to raise the liquid upward so that it may be circulated one or more times down through the ground coffee to produce the desired infusion or brew in the lower vessel. A removable top is provided to cover the juncture of the upper basket and vessel edges in order to make the combined vessel, basket, and fountain tube an operative liquid-tight assembly.

In the known prior art devices it has been customary to assemble the several elements so that the upper edges or rims of the coffee basket and vessel coincide with the lower side of the removable top closure. It follows that upon removal of such top closure the coffee basket rim remains flush with that of the vessel. When the top closure is removed after the infusing or brewing operation the coffee basket is found to contain a saturated soggy mass of wadded coffee grounds. In order to remove the coffee basket it is sometimes necessary for the operator of the coffee maker to reach down into the coffee basket and grasp the basket through the mass of saturated grounds. This task is objectionable and distasteful to many persons, and is further undesirable in that some of the spent coffee grounds may be dislodged so that they fall into the coffee infusion in the lower vessel.

It is an additional object of the present invention to provide in a coffee maker a removably supported coffee basket which obviates this disadvantage of the prior art devices.

Still another object of the present invention is to provide an improved releasably secured top closure for a coffee maker.

The foregoing as well as other objects and advantages will become more readily apparent from the following detailed description of the preferred structural embodiment of the invention and the accompanying drawings in which:

Fig. 2 is a view similar to a portion of Fig. 1 showing the top removed and the coffee basket in an elevated position;

Fig. 3 is a section view taken on the line 3—3 of Fig. 1;

Fig. 4 is a bottom view on a reduced scale of the embodiment of the coffee basket of my invention;

Fig. 5 is a fragmentary enlarged sectional elevation of certain of the elevating mechanism shown in Fig. 1; and Fig. 6 is a view similar to Fig. 5 showing a modified form of elevating mechanism suitable for use in the coffee maker shown in Fig. 1.

Figure 1:
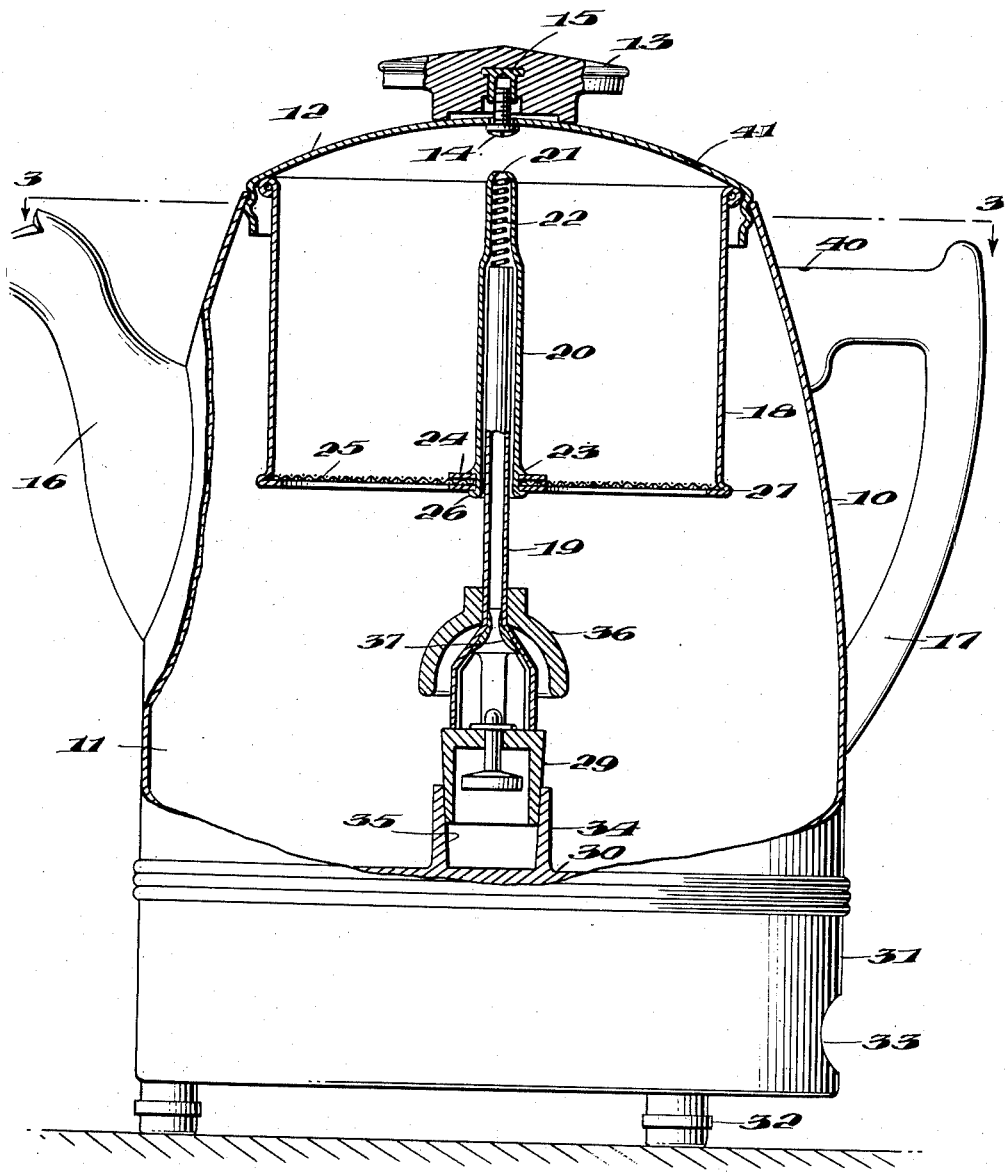
Fig. 1 is a side view, partially in elevation and partially in section, illustrating a coffee maker embodying my invention.

Referring to Fig. 1 there is shown a coffee making vessel 10 which may be made in conventional form and composed of stainless steel or other metal or glass. Interiorly of the vessel is a chamber 11 for holding the liquid to be infused. A removable top 12 closes the upper end of the vessel. A knob 13, optionally made of plastic in the preferred embodiment, is secured centrally of the top by means of a machine screw 14 which threads into a metallic insert 15 positioned internally of the knob. A pouring spout 16 and handle 17 are provided on opposite sides of the vessel.

An annular coffee basket 18 is located in the upper portion of vessel 10. Extending upwardly through the coffee basket is a fountain tube 19 for circulating liquid from the chamber 11 through ground coffee in the coffee basket, from which basket it recirculates back to chamber 11.

Coffee basket 18 may be formed of stainless steel or aluminum, and includes an axial support tube 20 of similar metal. A central opening 21 in tube 20 permits the liquid which rises in the fountain tube to reach the inner surface of top 12 from which surface it falls back through the coffee in the basket. An elevator spring 22 of stainless steel or other corrosion-resistant material is secured within the upper end of support tube 20 as will be more particularly described in connection with additional views of the drawings. The internal diameter of elevator spring 22 is preferably the same as that of fountain tube 19 in order not to impede the circulation of the liquid.

A first flange 23 near the lower end of support tube 20 bears against a washer 24 which secures an annular metallic mesh or gauze 25 across the bottom of coffee basket 18. A second flange 26, preferably formed by upsetting or spinning the lower extremity of tube 20, secures the mesh 25 centrally of the basket bottom, while a crimped flange 27 secures the periphery of the mesh at the edges of the basket bottom. The basket bottom is not solid, as shown more clearly in Fig. 4, but comprises a plurality of arms 28 sufficient in number to support the mesh 25 and narrow in cross section to permit the maximum recirculation of the liquid back to chamber 11.

To operate the coffee maker of the present invention, the chamber 11 is filled with the required amount of water for infusion and the necessary quantity of ground coffee is placed in coffee basket 18. The fountain tube 19 is seated firmly with the tapered lower member 29 engaging the complementary tapered wall section 35 of well 34 of the heat distributing plate 30 of the vessel 10 in a frusto-conical relation as more particularly described in applicant's co-pending application Serial Number 367,827 entitled, Coffee Maker, which application was filed on July 14, 1953 and resulted in Patent No.

2,784,678 on March 12, 1957 an electrical heating element, not shown, may be supported within the lower shell portion 31 of the coffee maker adjacent plate 30 and is adapted to be energized by the usual appliance cord set which may plug in through the opening 33. Legs 32 support the coffee maker in a heat insulating relation.

The liquid to be infused will be raised upward through the fountain tube 19 by means of any suitable form of pump such as tube arc including elements 36, 37, as disclosed.

The basket 18, having been filled with ground coffee, is affixed over tube 19, and the top closure 12 is secured to the upper edge of the coffee making vessel 10 by means of the bayonet locking elements 38, 39 as more specifically shown in Fig. 3. The application of top 12 serves to compress elevator spring 22 as shown in Fig. 1, whereby firm connection between the fountain tube and circulating means is insured when the cover is secured in place. Complementary indexing marks 40 and 41 may be provided on the adjacent surfaces of the handle and top, respectively, to indicate the proper alignment of the bayonet locking elements.

When top 12 is released from vessel 10 the elevator spring 22 acts to raise the upper rim of basket 18 above the highest edge of vessel 10 as indicated in Fig. 2 to facilitate removal of the coffee basket.

The elevating spring 22, as shown in the embodiments of Figs. 1 and 2, is preferably secured within the upper constricted portion of support tube 20 due to the fact that the upper end of spring 22 is deformed as indicated in Fig. 5, in order that such elevating spring may be retained within the internal opening of support tube 20.

An alternate construction indicated in Fig. 6 shows the elevating spring 22¹ as secured within the upper portion of tube 20¹ by reason of the fact that the normal untensioned external diameter of spring 22¹ is slightly greater than the internal diameter of the uniformly dimensioned tube 20¹. This construction affords manufacturing economies in that the extra steps of forming an upper constricted portion of the support tube and of deforming the elevating spring are eliminated.

It will be obvious to those skilled in the art that various modifications may be made in the preferred embodiment of the instant invention without limiting the scope of the invention as defined in the appended claims. For example, the knob 13 may be made of glass and fashioned to extend through the top in order to enable the liquid circulatory process to be observed.

What I claim is:

1. A coffee maker comprising a liquid holding vessel having a circular opening at the top, a fountain tube mounted to extend vertically upward within the vessel along the axis of the opening, a removable coffee basket within the vessel having a circular upper edge disposed concentric with the opening and having a central vertical support tube with an open upper end, said support tube being slidably mounted on the fountain tube and having an upper tube portion extending above the fountain tube, a cover for the vessel opening, means providing a detent engagement between the cover and vessel, a pump mounted on the fountain tube for pumping liquid in the vessel upwardly through the fountain tube and upper portion of the support tube to discharge the liquid under pressure from the open upper end of the support tube, a spiral spring confined in the upper portion of the support tube and acting between the fountain tube and support tube to yieldably support the basket in a normally protruding position through the vessel opening when the cover is removed and to urge the basket upper edge firmly against the cover when the cover is held in position by said detent means to provide a pressure chamber within the basket into which said liquid is discharged from the support tube.

2. A coffee maker comprising a vessel having an opening at the top, a cover for said opening, means providing detent engagement between said cover and vessel, a fountain tube in the vessel mounted to extend upwardly therein toward the opening, a coffee basket in the vessel, a vertical tube secured to the basket, said tubes having a telescopically slidable relation wherein the fountain tube has its upper end portion disposed within the vertical tube allowing upward removal of the basket from the fountain tube, a coil spring confined in said vertical tube with its upper end engaging said vertical tube and its lower end engaging the upper end of the fountain tube to urge the basket upwardly against the cover, and said spring having its coils distorted from normal unstressed shape by insertion of the spring into the tube whereby the spring will be frictionally held within the vertical tube when the basket is removed from the fountain tube.

References Cited in the file of this patent

UNITED STATES PATENTS

| 135,544 | Grigsby et al. | Feb. 4, 1873 |
| 192,946 | Smith | July 10, 1877 |
| 751,565 | Savage et al. | Feb. 9, 1904 |
| 882,712 | Pike | Mar. 24, 1908 |
| 1,053,735 | Lefevre | Feb. 18, 1913 |
| 1,377,984 | Lamb | May 19, 1921 |
| 1,550,336 | Bingham | Aug. 18, 1925 |
| 2,011,102 | Fisher et al. | Aug. 13, 1935 |
| 2,046,710 | Umstott | July 7, 1936 |
| 2,175,727 | Graham | Oct. 10, 1939 |
| 2,550,853 | Nugent | Mar. 1, 1951 |
| 2,617,352 | Olson et al. | Nov. 11, 1952 |
| 2,696,159 | Marquis | Dec. 7, 1954 |
| 2,817,743 | Foster | Dec. 24, 1957 |

FOREIGN PATENTS

| 203,514 | Germany | Oct. 22, 1908 |
| 390,351 | Germany | Feb. 18, 1924 |